(12) United States Patent
Iwai et al.

(10) Patent No.: US 7,061,954 B2
(45) Date of Patent: Jun. 13, 2006

(54) SEMICONDUCTOR OPTICAL WAVEGUIDE STRUCTURE

(75) Inventors: Norihiro Iwai, Tokyo (JP); Kazuaki Nishikata, Kanagawa (JP); Akihiko Kasukawa, Tokyo (JP)

(73) Assignee: The Furukawa Electric Co. Ltd., Tokyo (JP)

( * ) Notice: Subject to any disclaimer, the term of this patent is extended or adjusted under 35 U.S.C. 154(b) by 1340 days.

(21) Appl. No.: 09/888,930

(22) Filed: Jun. 25, 2001

(65) Prior Publication Data

US 2001/0036681 A1 Nov. 1, 2001

Related U.S. Application Data

(62) Division of application No. 08/961,851, filed on Oct. 31, 1997, now Pat. No. 6,281,523.

(30) Foreign Application Priority Data

Oct. 31, 1996 (JP) .............................. 8-289568

(51) Int. Cl.
*H01S 5/026* (2006.01)

(52) U.S. Cl. .......................................... 372/45; 385/14
(58) Field of Classification Search .................. 372/45; 385/14
See application file for complete search history.

(56) References Cited

U.S. PATENT DOCUMENTS

| | | | |
|---|---|---|---|
| 4,855,255 A | 8/1989 | Goodhue | |
| 4,981,766 A | 1/1991 | Aoike et al. | |
| 4,999,316 A | 3/1991 | Goodhue et al. | |
| 5,032,879 A | 7/1991 | Buchmann et al. | |
| 5,048,035 A | 9/1991 | Sugawara et al. | |
| 5,283,844 A | * 2/1994 | Rice et al. | |
| 5,517,039 A | 5/1996 | Holonyak, Jr. et al. | |
| 5,631,474 A | 5/1997 | Saitoh | |
| 5,764,671 A | 6/1998 | Lebby et al. | |
| 5,792,674 A | 8/1998 | Kitamura | |
| 5,809,051 A | 9/1998 | Oudar | |
| 5,821,569 A | 10/1998 | Dutta | |
| 5,892,786 A | 4/1999 | Lott | |
| 5,898,721 A | * 4/1999 | He | |
| 5,903,589 A | 5/1999 | Jewell | |
| 5,910,012 A | 6/1999 | Takeuchi | |
| 6,122,303 A | * 9/2000 | Major, Jr. | |
| 6,256,333 B1 | * 7/2001 | Johnson | |

* cited by examiner

*Primary Examiner*—George Fourson
(74) *Attorney, Agent, or Firm*—Rosenman & Colin LLP

(57) ABSTRACT

A method for manufacturing a semiconductor optical waveguide comprises the steps of forming a core layer having an Al content which monotonically increases from the central part thereof to the film surface, and selectively oxidizing the core layer to obtain a peripheral, oxidized region and a central, non-oxidized region acting as a waveguide. The waveguide is tapered to have a circular mode field at the distal end thereof for efficiently coupling with an optical fiber.

3 Claims, 15 Drawing Sheets

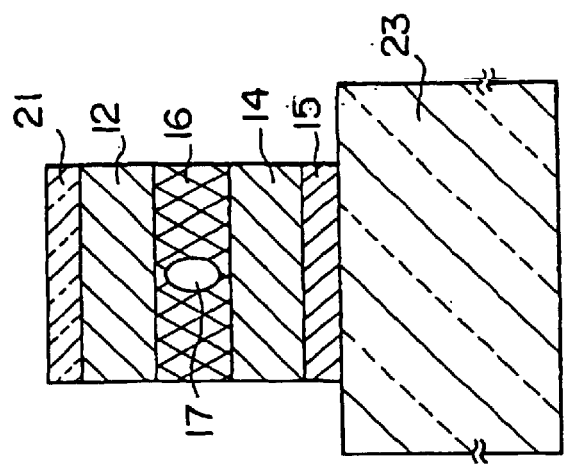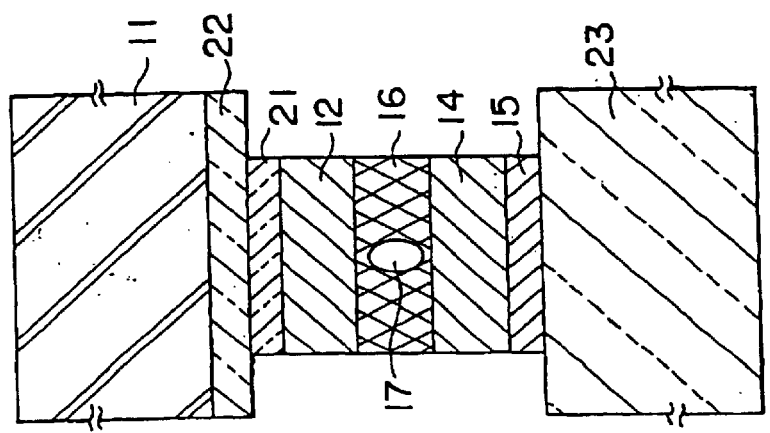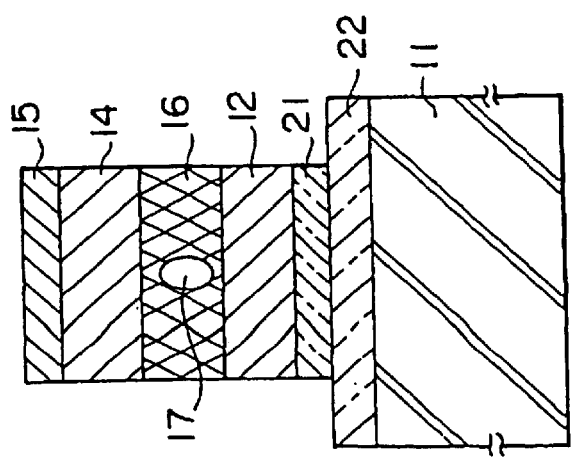

SEMICONDUCTOR OPTICAL WAVEGUIDE STRUCTURE

CROSS REFERENCE TO RELATED APPLICATION

This application is a Divisional of application Ser. No. 08/961,851, filed on Oct. 31, 1997 now U.S. Pat. No. 6,281,523.

BACKGROUND OF THE INVENTION (a) Field of the Invention

The present invention relates to a structure and a method for manufacturing a semiconductor optical waveguide and, more particularly, to fabrication of an improved optical waveguide for achieving a high coupling efficiency with an optical fiber by forming a circular and narrow optical beam in a semiconductor laser or a photodetector.

(b) Description of the Related Art

The mode field of an optical signal from a semiconductor laser device, for example, should be adjusted to the mode field of an optical fiber to be coupled for obtaining a high coupling efficiency as much as possible. A mode field converter (MFC) is generally installed for this purpose in the semiconductor laser device.

FIG. 1 is a cross-sectional view of a conventional product of a semiconductor laser device having a MFC, and FIGS. 2A and 2B are cross-sectional views thereof taken along lines A–A' and B–B' in FIG. 1. FIGS. 3, 4A, 4B, 5A and 5B show the semiconductor laser device of FIG. 1 in consecutive steps of fabrication process therefor, wherein FIG. 3 showing a first step thereof corresponds to FIG. 1, FIGS. 4A and 4B showing a second step correspond to FIGS. 2A and 2B, respectively, and FIGS. 5A and 5B showing a third step correspond to FIGS. 2A and 2B, respectively. The structure and the fabrication process for the conventional semiconductor laser will be described with reference to these drawings.

In general, a semiconductor laser device having a MFC section is fabricated by an epitaxial growth process using a low-pressure MOCVD (metal-organic chemical vapor deposition) method from the viewpoint of process simplification. In the fabrication process, first, a $SiO_2$ film is deposited on a n-type InP substrate (n-InP substrate) 101 by using a plasma-enhanced CVD technique. The $SiO_2$ film is then selectively etched by a photolithography and a wet etching technique using a BHF (buffered hydrofluoric) solution to obtain a plurality of stripe $SiO_2$ patterns 120 shown in FIG. 3. Each of the stripe patterns 120 has a rectangular shape which is 800-μm long (L) and 60-μm wide (W), and each two of the stripe patterns 120 form a stripe pair with the distance (d) therebetween being, for example, 10 μm. The stripe pairs are arranged in a matrix, with a gap (D1) of 300 μm in the column direction and a pitch (D2) of 250 μm in the row direction. Each of the stripe pairs and the area adjacent thereto in the column direction is formed as a semiconductor laser device, and accordingly, FIG. 3 shows an area for a plurality of semiconductor laser devices formed in a single process.

After the stripe $SiO_2$ patterns 120 are formed on the substrate 101, as shown in FIG. 4A, an n-InP cladding layer 102, an InGaAsP/InGaAsP quantum well active layer 103 and a p-InP cladding layer 104 are consecutively grown on the exposed surface of the n-InP substrate 101 not covered by the stripe $SiO_2$ patterns 120. In this epitaxial step, thick epitaxial layers 102 to 104 are formed in the belt area 124 (FIG. 3) disposed between each stripe pair, as shown in FIG. 4A, whereas thin epitaxial layers 102 to 104 re-formed in the other area, as shown in FIG. 4B.

After the stripe $SiO_2$ patterns 120 are removed by a BHF solution, a second $SiO_2$ film is deposited on the entire surface by a plasma-enhanced CVD technique. Thereafter, the second $SiO_2$ film is patterned using a photolithography and a wet etching technique to leave a belt $SiO_2$ film 121 on each 4.0-μm-wide belt zone defined by the belt areas 124 arranged in a column direction and the spaces between the adjacent belt areas 124 arranged in the column direction. A wet etching is then performed using the belt $SiO_2$ film 121 as a mask and bromomethanol as an etchant to selectively remove the n-InP cladding layer 102, the quantum well active layer 103 and p-InP cladding layer 104, as a result of which 1.5-μm-wide mesa stripe 123 is left below the 4.0-μm-wide belt $SiO_2$ film 121, as shown in FIGS. 5A and 5B.

Subsequently, blocking layers including p-InP layer 105 and n-InP layer 106 are laminated on the side surface of the mesa stripe 123, thereby embedding the mesa stripe 123 by using a MOCVD method as shown in FIGS. 2A and 2B. Thereafter, the belt $SiO_2$ film 121 is removed using a BHF solution, followed by a MOCVD process to form consecutively a p-InP cladding layer 107 and a p-InGaAs contact layer 108. Next, the p-InGaAs contact layer 108 in the upper part of a MFC section B1 is selectively removed by a photolithography and a wet etching technique using a tartaric acid based etchant, the MFC section B1 being shown in FIG. 2B.

Then, a third $SiO_2$ film 122 is deposited by a plasma-enhanced CVD process, and patterned to have an opening for an electric contact to be used for injection of carries in a laser section A1 as shown in FIG. 2A. Thereafter, the n-InP substrate 101 is polished at the bottom surface thereof to reduce the thickness thereof down to about 100 μm, followed by formation of p-side electrode 109 and n-side electrode 110 on the top surface and the bottom surface, respectively, of the resultant wafer, to obtain the structure shown in FIGS. 1, 2A and 2B.

In the conventional semiconductor laser device as described above, the cladding layer 102 and the laser active layer 103 have smaller thicknesses in the laser section Al than in the MFC section B1. By this configuration, a narrow and excellent optical beam can be obtained from the MFC section B1 because of the smaller optical confinement area of the MFC section B1. In this case, because the MFC section B1 is transparent for laser light, the optical loss is small in the optical transmission.

For the conventional semiconductor laser device having a MFC section as described above, a complicated process is required to form the optical waveguide therein. In addition, since the waveguide does not have a current confinement function in the direction of the resonator of the laser device, there arise a problem in that the carriers supplied to the laser section leak to the MFC section to raise the threshold current for the lasing of the laser device.

In the case of the above described semiconductor laser device, the n-InP substrate used therein requests a p-InP epitaxial layer as the top layer for the layer structure, wherein the carrier leakage is effected by holes (not by electrons), which fact reduces the carrier leakage compared to the case wherein a p-type substrate is used and thereby the carrier leakage is effected by electrons. If a p-type substrate is used instead in the above laser device, the carrier leakage effected by electrons raises a larger problem.

SUMMARY OF THE INVENTION

It is therefore an object of the present invention to provide a method for manufacturing an optical waveguide which has a high coupling efficiency with an optical fiber, and which is capable simplifying the fabrication process of the semiconductor optical device.

It is another object of the present invention to provide a semiconductor optical device having a spot size converter instead of the conventional MFC converter and less susceptible to the carrier leakage problem.

The present invention provides a method for manufacturing a semiconductor optical waveguide comprising the steps of forming a first semiconductor layer overlying a semiconductor substrate, the first semiconductor layer having an aluminum concentration which increases from a central part, as viewed in the thickness direction of the first semiconductor layer, toward both surfaces of the first semiconductor layer, and selectively oxidizing the first semiconductor layer to obtain a non-oxidized region constituting an optical waveguide and an oxidized region surrounding the non-oxidized region.

The present invention also provides, in another aspect thereof, a semiconductor laser device comprising a optical waveguide manufactured by the method as described above, wherein the first semiconductor layer contains one or more materials selected from the group consisting of $Al_xIn_{1-x}As$, $Al_xIn_{1-x}P$, $Al_xGa_{1-x}P$, $(Al_xGa_{1-x})_yIn_{1-y}P$, and $(Al_xGa_{1-x})_yIn_{1-y}As$, given x and y being between 0 and 1.

In accordance with the method according to the present invention, the profile of the Al content in the first semiconductor layer provides an excellent optical waveguide by selectively oxidizing the first semiconductor layer. As a result, the waveguide can be fabricated by a simpler process.

In addition, the waveguide thus formed has a controlled width thereof to thereby obtain a high coupling efficiency in the optical coupling with an optical fiber. Further, in the semiconductor optical device having the waveguide thus formed, leakage current from a semiconductor optical element to the optical waveguide is reduced by the dielectric property of the oxidized region of the first semiconductor layer surrounding the non-oxidized region.

The above and other objects, features and advantages of the present invention will be more apparent from the following description, referring to the accompanying drawings.

BRIEF DESCRIPTION OF THE DRAWINGS

FIGS. 9A, 9B and 9C are cross-sectional views of a semiconductor optical device in consecutive steps of fabrication process according to a third embodiment of the present invention;

PREFERRED EMBODIMENTS OF THE INVENTION

Now, the present invention is more specifically described with reference to accompanying drawings. In this text, all numerals for specifying a width, thickness, temperature or time length are all approximate values if not specifically recited as such. In addition, A1 and B2 represent a semiconductor laser section and a spot beam converter section, respectively, in a semiconductor optical device. Further, Al content as used herein is referred to as a ratio of an Al content to a sum of Al content and the content of other III group elements, such as Ga.

Figure 1:
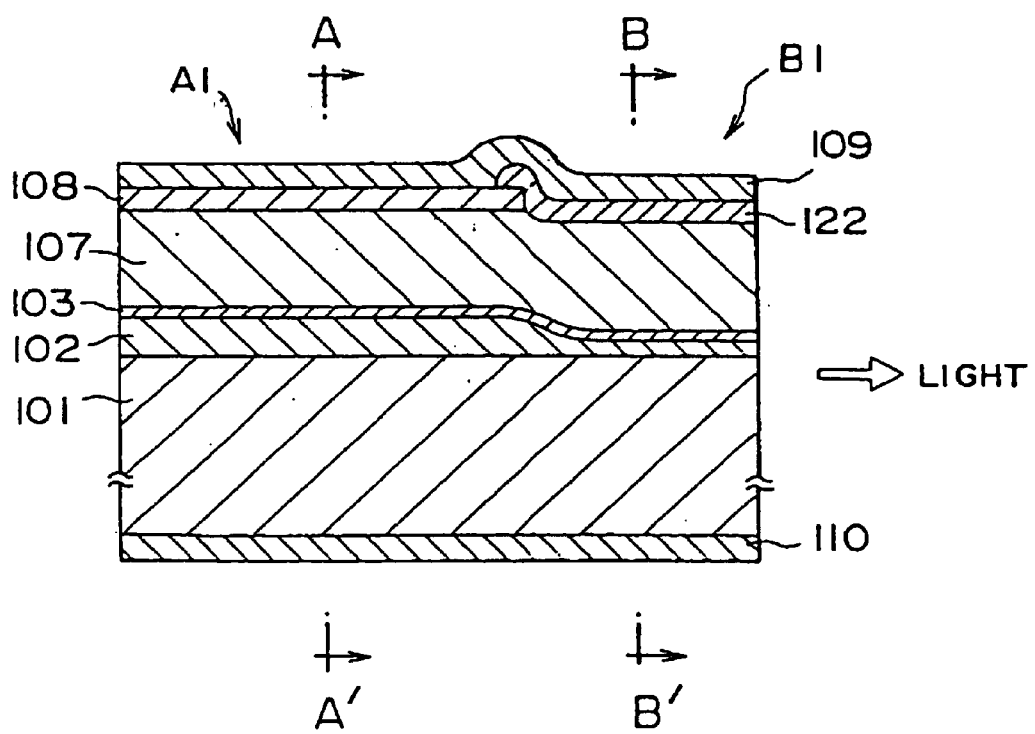
FIG. 1 is a cross-sectional view of a conventional semiconductor laser device having a MFC.
Figure 2A:
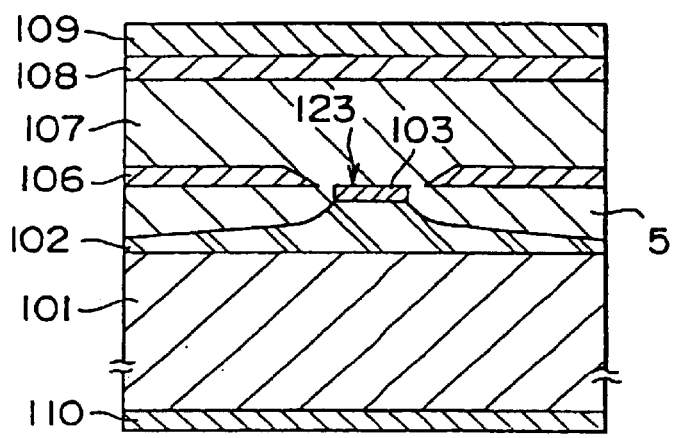
FIGS. 2A and 2B are cross-sectional views of the semiconductor laser device of FIG. 1 taken along lines A–A' and B–B', respectively, in FIG. 1.
Figure 2B:
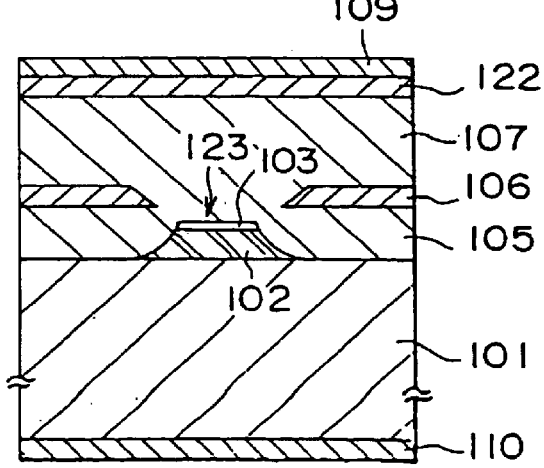
Figure 3:
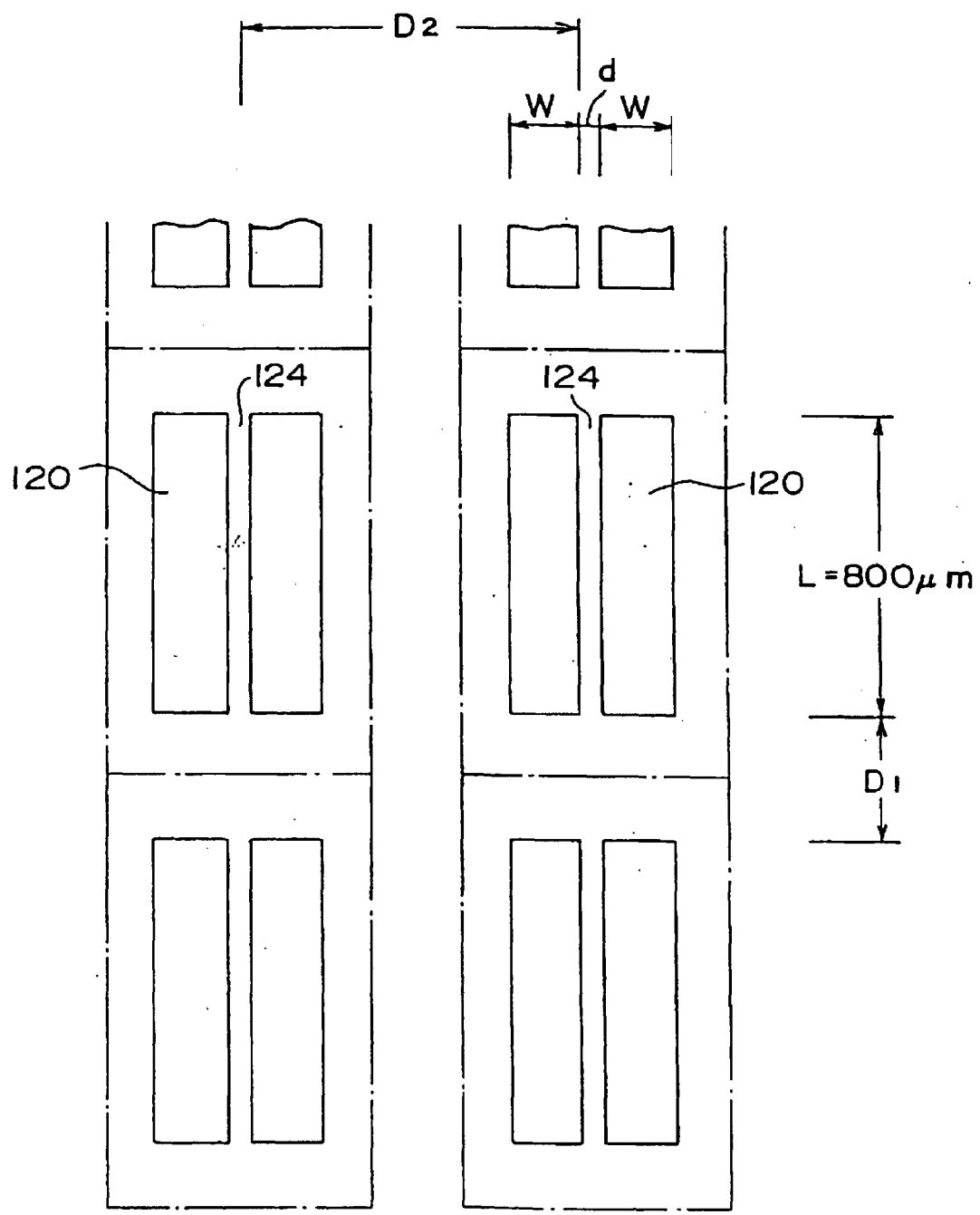
FIG. 3 is a top plan view of the semiconductor laser device of FIG. 1 in the first step of fabrication process therefor.
Figure 4A:
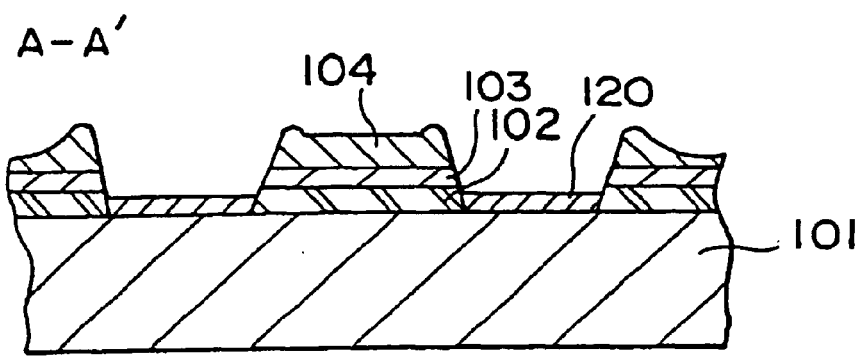
FIGS. 4A and 4B are cross-sectional views similar FIGS. 2A and 2B in the second step of the fabrication process following the first step.
Figure 4B:
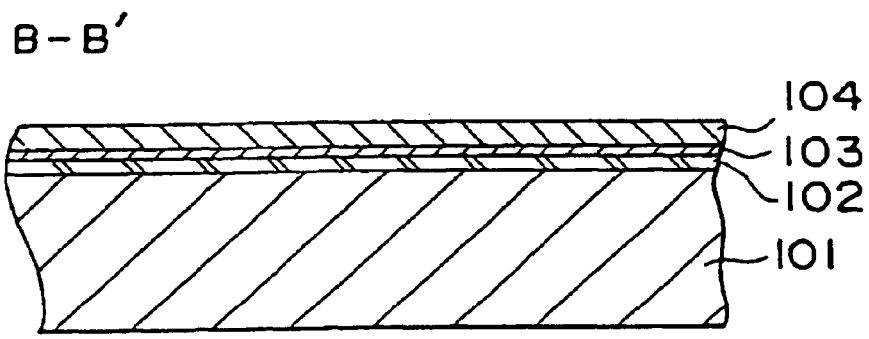
Figure 5A:
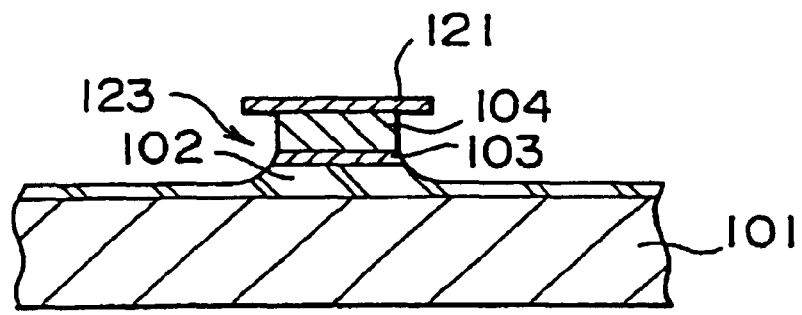
FIGS. 5A and 5B are cross-sectional views similar to FIGS. 4A and 4B in the third step following the second step.
Figure 5B:
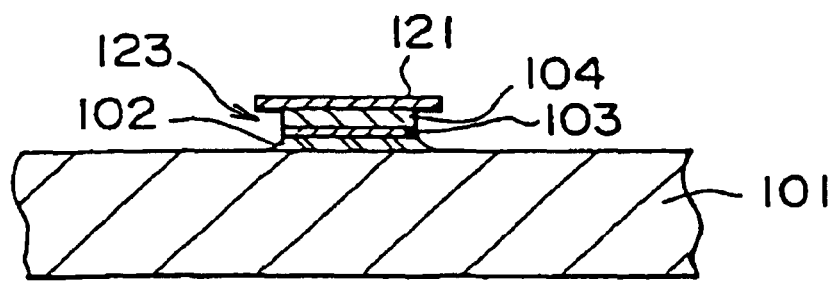
Figure 6A:
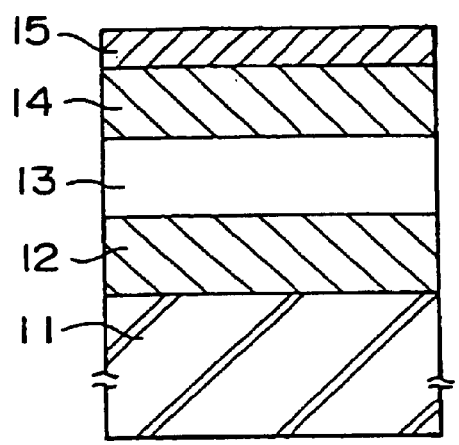
FIGS. 6A and 6B are cross-sectional views of a semiconductor optical waveguide in consecutive steps of a fabrication process therefor according to a first embodiment of the present invention.
Figure 6B:
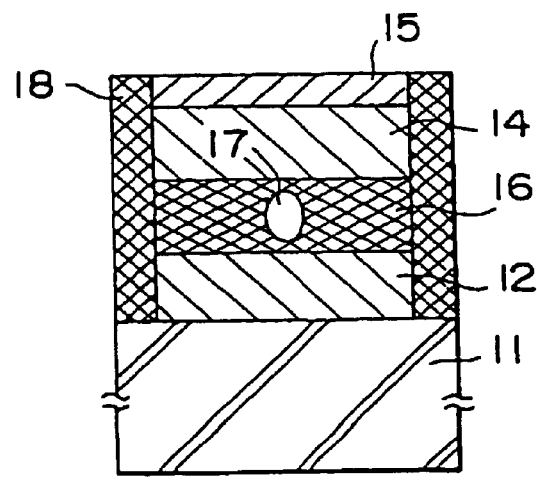

Referring to FIGS. 6A and 6B showing a laser section A1 and a spot beam converter section B2, respectively, of a semiconductor optical device according to a first embodiment of the present invention, fabrication process for a semiconductor laser waveguide in the semiconductor optical device will be described hereinafter.

A 1.0-μm-thick $Al_{0.3}Ga_{0.7}As$ cladding layer 12, a 2.0-μm-thick Al(Ga)As core layer 13 having an Al content which monotonically increases from the central part thereof, as viewed in the direction of the thickness, toward both the surfaces (or peripheral parts) of the core layer 13, a 1.0-μm-thick $Al_{0.3}Ga_{0.7}As$ cladding layer 14 and a 0.2-μm-thick GaAs gap layer 15 are consecutively grown on a GaAs substrate 11 by an MBE (molecular beam epitaxy) technique. It is preferred that the Al(Ga)As core layer 13 have a composition of $Al_xGa_{1-x}As$ ($0.5 \leq x \leq 0.97$) at the central part thereof and the composition of AlAs at both the surfaces thereof.

Figure 7A:
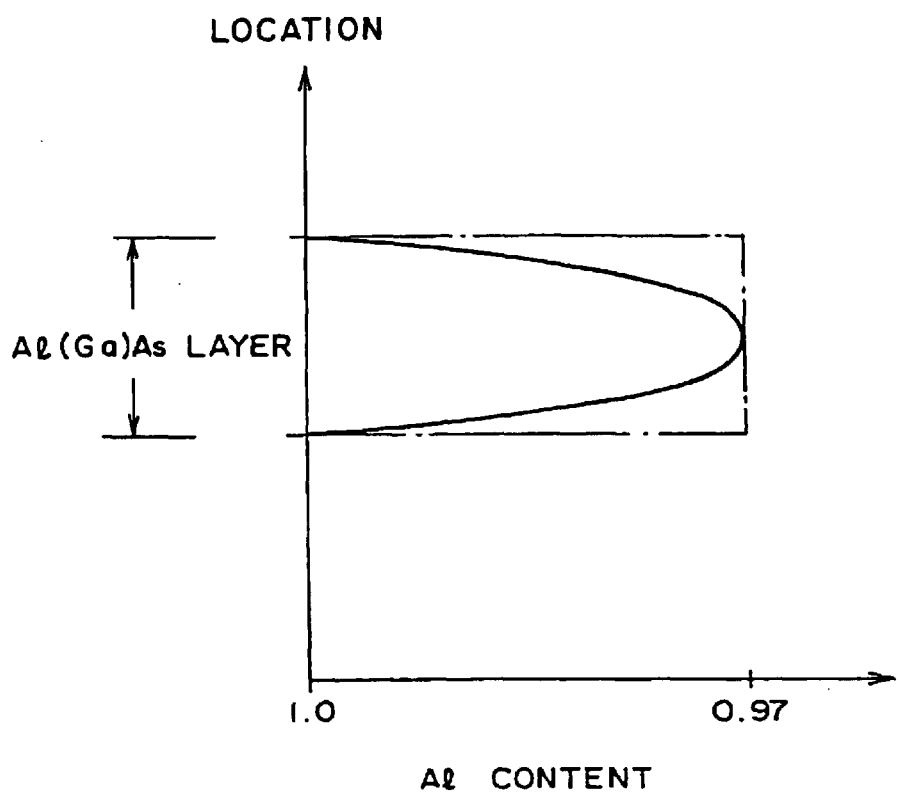
FIGS. 7A and 7B are profiles of the Al content and refractive index, respectively, in the core layer shown in FIGS. 6B.

The oxidation rate of the $Al_xGa_{1-x}As$ is determined by the Al content thereof: if the core layer 13 has an Al content of 97% (where x=0.97), for example, then the oxidation rate assumes 1/10 of the oxidation rate of AlAs. In the later oxidation step for the core layer 13 to control the width of the waveguide, an excellent width control can be obtained by employing the configuration wherein the Al content is below or equal to 97% at the central part of the core layer and 100% at both the surfaces thereof. FIG. 7A shows an example of the Al(Ga)As profile in the core layer 13, wherein x=0.97 at the central part and substantially x=1.0 at both the surfaces.

The profiles of $Al_{0.97}Ga_{0.03}As$ at the central part and AlAs at both the surfaces can be obtained by using a MBE technique, for example. In the MBE technique, the Al cell temperature is changed continuously to provide a continuous change of the Al content in the core layer 13, which is often used in the current technique during the MBE. The Al content is preferably controlled continuously in the direction of the thickness, although it may be controlled stepwise. If a continuous control is difficult to achieve, as in the case of using a MOCVD technique, or if a material other than Al(Ga) As is used for the core layer, the Al content may be changed stepwise, which can also provide similar advantages.

Subsequently, the GaAs cap layer 15, $Al_{0.3}Ga_{0.7}As$ cladding layer 14, Al(Ga)As core layer 13 and $Al_{0.3}Ga_{0.7}As$ cladding layer 12 are selectively removed by a photolithography and a wet etching technique, thereby obtaining a stripe ridge of a 5 μm width.

Thereafter, the entire wafer is submerged in hot pure water maintained at about 90° C. bubbled with nitrogen ($N_2$) gas for a thermal treatment at about 400° C.~450° C. for 10 minutes. As a result, the Al(Ga) As core layer 13 is selectively oxidized to form a peripheral, oxidized Al(Ga)As region of the core layer and a central, non-oxidized Al(Ga) As region of the core layer having a circular cross-section and encircled by the oxidized Al(Ga) As region 17. If the Al content at the central part is 97%, then the oxidation rate thereof is about 0.2 μm/min., whereas AlAs exhibits 2 μm/min. at each surface area of the core layer. The non-oxidized region 17 is used as a waveguide and has a substantially circular shape of a 1.0 μm diameter. The temperature 400~450° C. and the time length for the thermal treatment are changed depending on the material used.

Figure 7B:
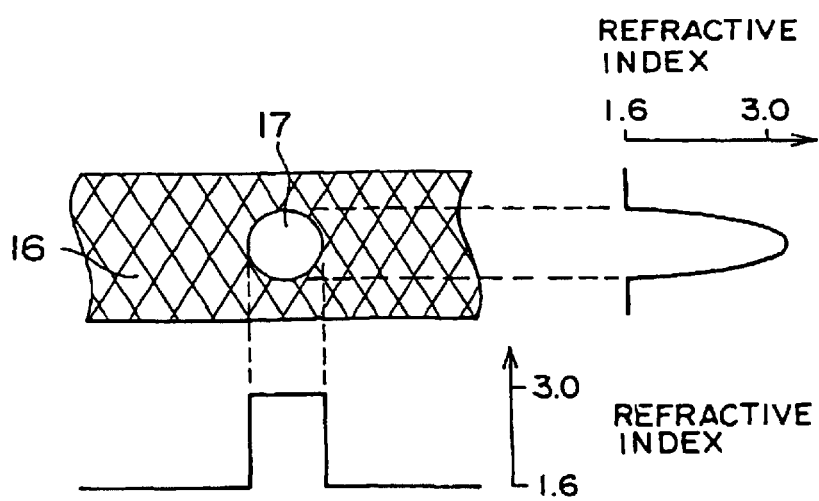

Specifically, the oxidized region of the Al(Ga) As core layer 13 decreases its refractive index down to 1.6, which is sufficiently lower compared to the refractive index of 2.95 in the non-oxidized region 17 after the AlAs is converted into $Al_xO_y$ (Al oxide) in the oxidized region 16. FIG. 7B shows the profiles of the refractive index in the directions normal and parallel to the film surface, plotted against the location of the waveguide. These profiles of the refractive index enable the incident/emitted light to be guided along the non-oxidized region 17, i.e., central waveguide having a high refractive index, in a high efficiency. The final step of the fabrication process provides a polyimide cover coat 18 on each side of the stripe ridge, as shown in FIG. 6B.

The semiconductor optical waveguide thus fabricated has a substantially circular mode field, which allows a high coupling efficiency between the waveguide and an optical fiber because the difference between their mode fields is small. In addition, the height (or vertical length) of the optical waveguide can be controlled during the epitaxial process, whereas the width (or horizontal length) of the optical waveguide can be controlled by the Al content and the oxidation rate of the core layer, which allows a substantially circular optical mode field without using a re-growth step for growing the optical confinement layer around the waveguide. Further, the optical waveguide may be effective for reducing polarization dependency in some cases.

In the first embodiment as described above, the Al(Ga)As core layer 13 is employed. However, the material for the core layer 13 may be selected from other materials which contain Al and can be controlled in the refractive index thereof by oxidation etc. Examples of the materials used for this purpose include $Al_xIn_{1-x}As$, $Al_xIn_{1-x}P$, $Al_xGa_{1-x}P$, $(Al_xGa_{1-x})_yIn_{1-y}P$, and $(Al_xGa1-x)_yIn_{1-y}As$ ($0 \leq x \leq 1$, $0 \leq y \leq 1$) etc and a combination thereof. The epitaxial process may be effected by a MOCVD technique instead of the MBE technique.

Figure 8:
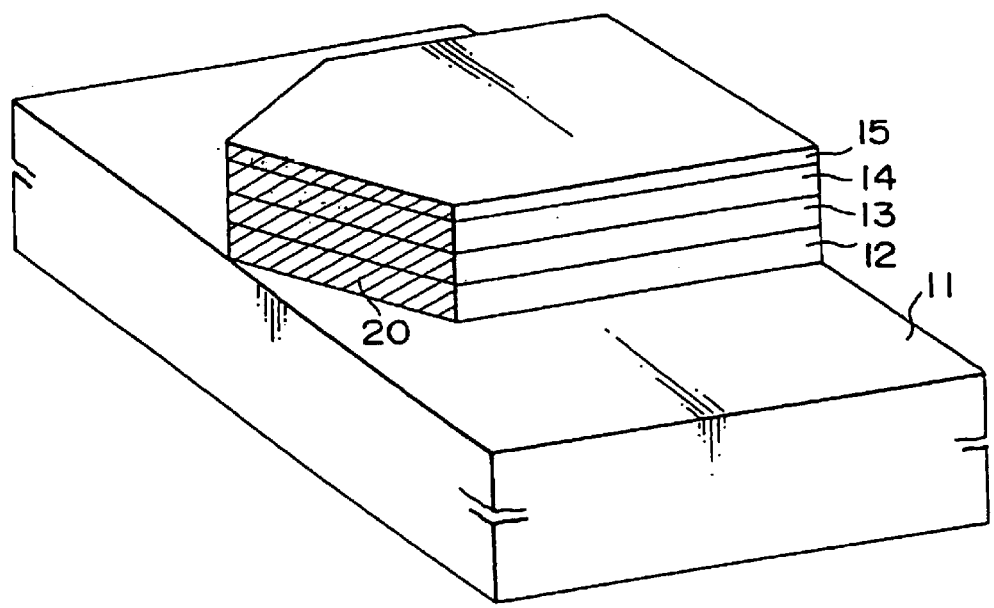
FIG. 8 is a perspective view of a semiconductor optical waveguide according to a second embodiment of the present invention.

Referring to FIG. 8 showing a semiconductor laser device according to a second embodiment of the present invention, the optical waveguide in the device is of a tapered ridge structure which reduces the horizontal width thereof as viewed along the travelling direction of the incident/emitted light. The process for the lamination or oxidation is similar to the first embodiment as described above. In the present embodiment, the optical waveguide is obtained by forming a tapered ridge structure of the core layer and subsequent oxidation thereof, followed by coating of an anti-reflection film 20 on each side of the tapered ridge for prevention of reflection of incident/emitted light. The anti-reflection coat 20 may be made of dielectrics such as $SiO_2$, $SiN_x$ and $Al_2O_3$ and has a thickness of, for example, λ/4 wherein λ is the wavelength of the incident/emitted light.

In the semiconductor optical waveguide according to the present embodiment, since the oxidation rate of the core layer is constant as viewed in the travelling direction of the incident/emitted light, the width of the waveguide can be gradually narrowed along the travelling direction of the light toward the small distal end of the tapered waveguide. That is, the distal end of the waveguide has a large optical mode field so that the allowance of the coupling error is large in the coupling between the optical waveguide and an optical fiber. The distal end of the tapered ridge may have a sharp edge as shown in FIG. 8 or may have a small width edge or round (circular) shape as viewed in the vertical direction. The advantages obtained by the modification are similar to the second embodiment.

A semiconductor optical device according to a third embodiment of the present invention will be described with reference to FIGS. 9A, 9B and 9C showing a waveguide in consecutive steps of the fabrication process therefor, wherein similar elements are designated by similar reference numerals in the drawings. An AlAs etch stop layer 22 and a GaAs contact layer 21 are consecutively grown on a GaAs substrate 11 by using a MBE technique. Subsequently, a 1.0-μm-thick $Al_{0.3}Ga_{0.7}As$ cladding layer 12, and a 2.0-μm-thick Al(Ga)As core layer 13 which has an Al content increasing as viewed from the central part toward both the surfaces thereof, a 1.0-μm-thick $Al_{0.3}Ga_{0.7}As$ cladding layer 14 and a 0.2-μm-thick cap layer 15 are consecutively grown on the GaAs substrate 11 by using a MBE technique. Then, a stripe ridge is formed by selective etching, followed by a thermal treatment for selectively oxidizing the Al(Ga)As core layer 13 to form an optical waveguide 17.

Subsequently, the GaAs layer 15 disposed on the top of the stripe ridge is bonded onto an InP substrate 23 by a direct bonding technique to form a bonded wafer shown in FIG. 9B. Thereafter, the GaAs substrate 11 and the AlAs etch stop layer 22 are entirely removed by a wet etching technique, as shown in FIG. 9C.

In accordance with the third embodiment, if a material containing Al cannot be grown, as in the case of different lattice constants between the substrate and waveguide to be formed thereabove, a semiconductor optical waveguide having excellent characteristics and a substantially circular shape can be obtained.

The first to third embodiments have exemplified configurations wherein doping is not employed in each layer for prevention of absorption loss (free-carrier absorption) in the waveguide. However, doping may be employed in each layer to ease current injection, as in the following embodiment.

Figure 10A:
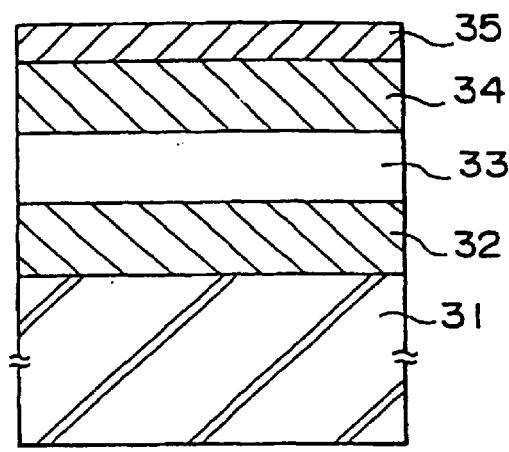
FIGS. 10A and 10B are cross-sectional views of a semiconductor optical device in consecutive steps of a fabrication process according to a fourth embodiment of the present invention.
Figure 10B:
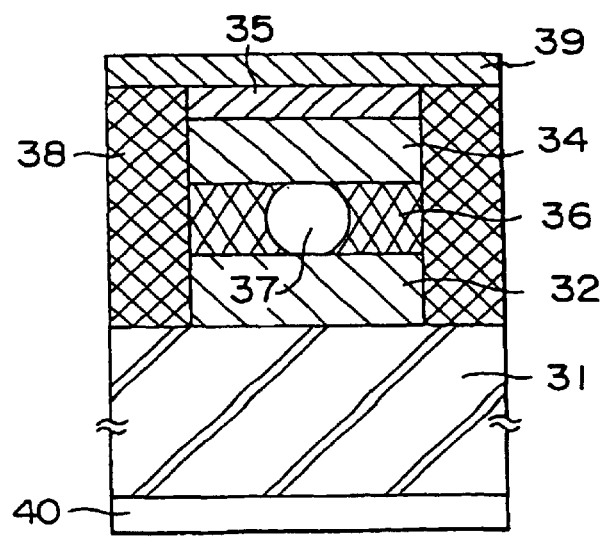

FIGS. 10A and 10B show a laser section A1 and a spot beam converter B2, similarly to FIGS. 6A and 6B, respectively, a semiconductor optical device according to a fourth embodiment of the present invention.

A 1.0-μm-thick n-$Al_{0.3}Ga_{0.7}As$ layer 32, a 0.5-μm-thick undoped Al(Ga)As layer 33 having an Al content which increases as viewed from the central part toward both the surfaces thereof, a 1.0-μm-thick p-AlGaAs layer 34 and a 0.2-μm-thick p-GaAs cap layer 35 are consecutively grown on an n-GaAs substrate 31 by a MBE technique. In this step, S1 is used as an n-type dopant, and Be is used as a p-type dopant. The process is similar to that of the first embodiment except for the doping.

The shaping step for obtaining the stripe ridge and the thermal oxidation step are effected, similarly to the first embodiment, to form an oxidized region 36 and a non-oxidized region 37 in the Al(Ga)As layer 33, the non-oxidized region 37 being formed as a waveguide. The n-GaAs substrate 31 is polished by a chemical-mechanical polishing (CMP) process to reduce the thickness thereof down to 100 μm, followed by formation of n-side and p-side electrodes 39 and 40 to obtain the final structure.

In the structure of the fourth embodiment, similar advantages can be obtained. In addition, the present embodiment can be applied to an optical switch, a photo-amplifier, an optical modulator etc., because of the structure for allowing the injection of current. Moreover, the present embodiment can be applied to an optical switch, a photo-amplifier, an optical modulator etc. of an electric field absorption type, by forming a quantum well structure in the central part of the waveguide.

Figure 11A:
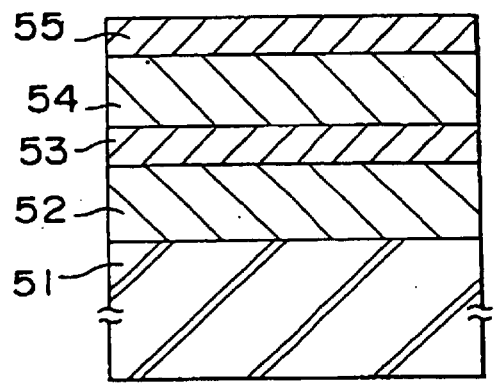
FIGS. 11A and 11B are cross-sectional views of a semiconductor optical device in consecutive steps of a fabrication process according to a fifth embodiment of the present invention.
Figure 11B:
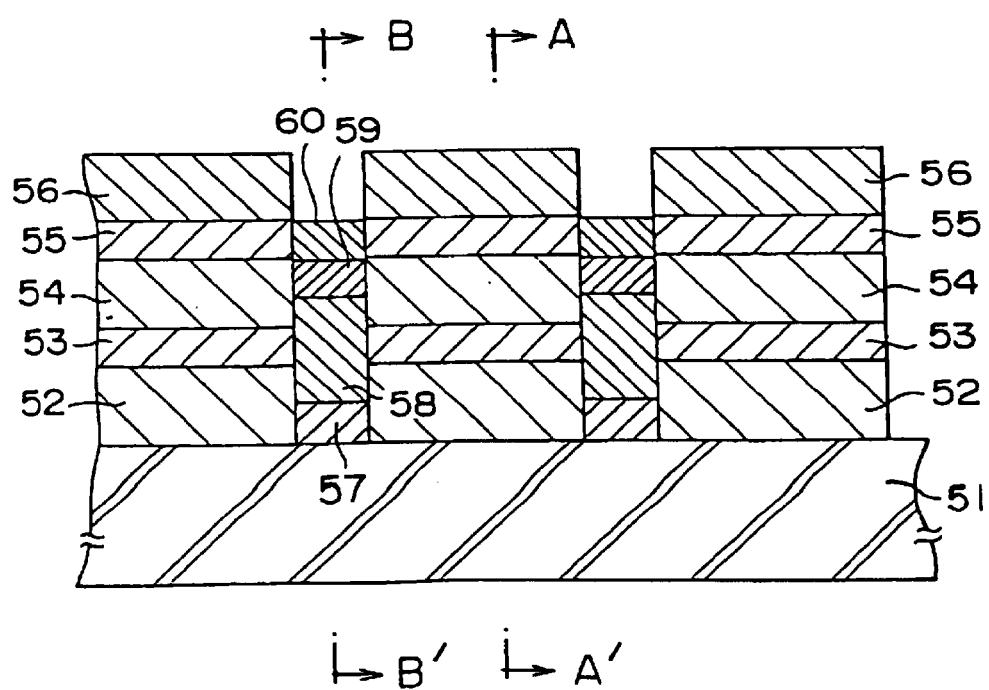
Figure 12A:
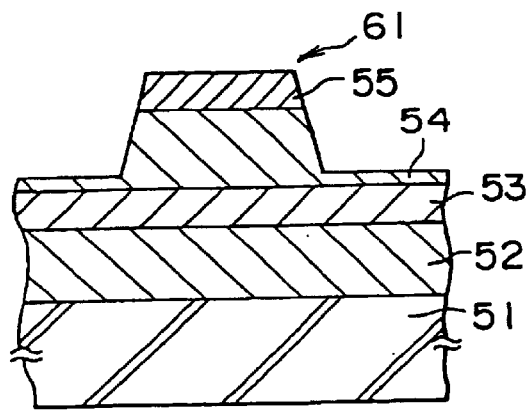
FIGS. 12A and 12B are cross-sectional views of the semiconductor optical device of FIG. 11B taken along lines A–A' and B–B', respectively, in FIG. 11B.
Figure 12B:
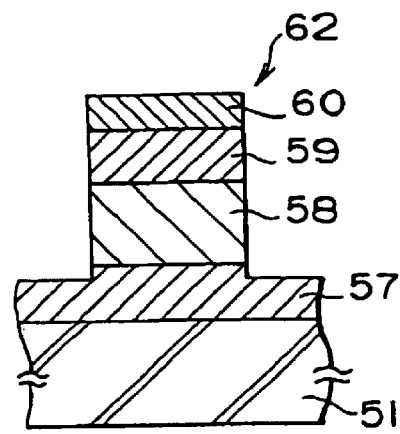

A semiconductor laser device according to a fifth embodiment of the present invention, which has a spot size converter therein, is described with reference to FIGS. 11A and 11B showing consecutive steps of fabrication therefor, and FIGS. 12A and 12B showing cross-sections taken along lines A–A' and B–B', respectively in FIG. 11B. First, as shown in FIG. 11A, a 2.0-μm-thick n-$Al_{0.3}Ga_{0.7}As$ cladding layer 52, a quantum well layer 53 composed of multi InGaAs well and multi GaAs barrier, a 2.0-μm-thick p-$Al_{0.3}Ga_{0.7}As$ cladding layer 54 and a 0.5-μm-thick contact layer 55 are consecutively grown on an n-GaAs substrate 51 by a MOCVD technique.

subsequently, as shown in FIG. 11B, a plurality of 1500-μm-long strip $SiO_2$ film 56 arranged at a pitch of 500 μm is formed by a photolithography, followed by selective etching, using the $SiO_2$ films 56 as a mask, p-GaAs contact layer 56, p-$Al_{0.3}Ga_{0.7}As$ cladding layer 54, the InGaAs/GaAs quantum well layer 53 and n-$Al_{0.3}Ga_{0.7}As$ cladding layer 52. Thereafter, by using the $SiO_2$ films 16 as a mask for selective growth, a 0.5-μm-thick AlGaAs cladding layer 57, a 2.0-μm-thick Al(Ga)As core layer 58 having an Al content which monotonically increases as viewed from the central part toward both the surfaces, a 0.5-μm-thick $Al_{0.3}Ga_{0.7}As$ cladding layer 59 and a 0.5-μm-thick GaAs contact layer 60 are consecutively grown, to obtain the structure shown in FIG. 11B.

It is preferable that the Al(Ga)As core layer 68 have a composition of $Al_xGa_{10x}As$ (x≦0.97) at the central part and a composition of AlAs at both the surfaces thereof. For example, the profile is such that x=0.97 (Al 97%) at the central part and x=1 (Al 100%) at both the surfaces. By this configuration, an oxidation rate ratio of about 1:10 can be obtained.

The Al content in the Al(Ga)As core layer 58 as described above can be obtained by continuously changing the flow rate of the source gas by using a mass flow controller in the MOCVD method. If a MBE method is employed in place of the MOCVD method, the composition of Al(Ga)As can be continuously controlled by continuously changing the substrate temperature, for instance. However, the selective growth method employed in the present embodiment renders the MOCVD method more suitable.

The composition of AlGaAs should be changed continuously in the core layer in an ideal device; however, it is not indispensable. Especially, if the composition control in the core layer is difficult to achieve, as in the case of materials being other than AlGaAs, a stepwise control is usually employed because of the difficulty. Also in this case, similar advantages can be achieved.

Then, the p-GaAs contact layer 55 and an upper portion of the p-$Al_{0.3}Ga_{0.7}As$ cladding layer 54 grown by the first epitaxial growth is removed using a photolithography and an etching technique, thereby forming a 4-μm-wide mesa stripe ridge 61 extending in the direction normal to the stripe $SiO_2$ film 56, as shown in FIG. 12A. Then, GaAs layer 60, AlGaAs layer 59, AlGaAs core layer 58 and a portion of the AlGaAs cladding layer 57 grown by the second epitaxial step are selectively removed by a photolithography and an etching technique, thereby forming a mesa tapered ridge 62 having an optical axis aligned with the optical axis of the mesa stripe ridge 61, as shown in FIG. 12B which is taken along line B–B' in FIG. 11B.

Figure 12C:
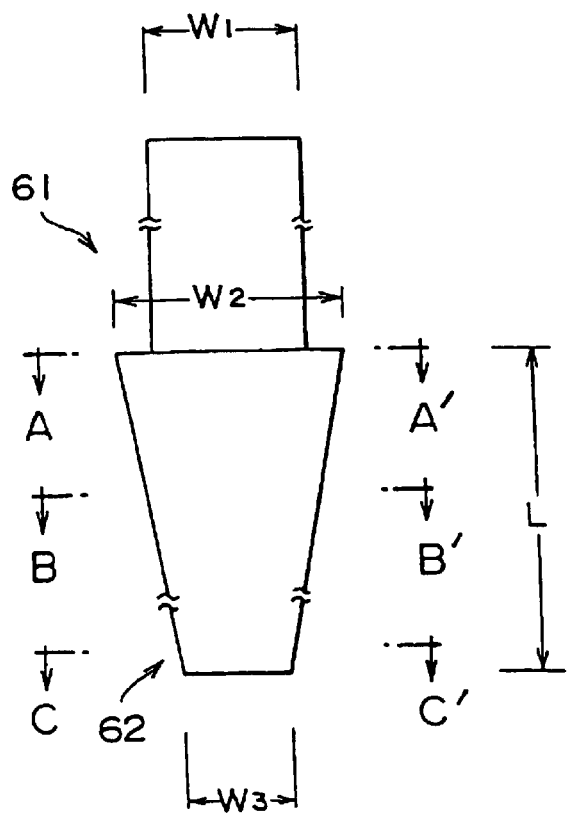
FIG. 12C is a top plan view of the stripe ridge and the tapered ridge in the semiconductor optical device of FIGS. 11A and 11B.

FIG. 12C is a top plan view showing the stripe ridge 61 and the tapered ridge 62. The tapered ridge 62 has a width (W2) of about 6.0 μm at the side adjacent to the stripe ridge 61, a width (W3) of 3.0 μm at the opposite side, and a total length (L) of 100 μm. The width (W1) of the laser section 61 is 4 μm, as recited before. The size and shape of the tapered ridge 62 should be designed for the size and shape of the stripe ridge 61. For example, it is preferable that the width (W2) of the tapered ridge 62 adjacent to the laser section (or at the receiving facet of the tapered ridge 62 is designed equal to or more than the width (W1) of the stripe ridge 61. The distal end (or emission end) of the tapered ridge 62 may be round or sharp as viewed in the vertical direction. The configuration of the core layer, such as ridge width, thickness, composition and oxidation time, should be designed for obtaining a circular cross-section of the waveguide to be formed after the oxidation of the core layer.

Subsequently, the resultant wafer is submerged in hot water maintained at about 90° C. bubbled with nitrogen ($N_2$) gas for a thermal treatment at a temperature of 400° C.~450° C. for five minutes. As a result, the periphery of the Al(Ga)As core layer 58 in the tapered ridge 62 is oxidized, to obtain an oxidized Al(Ga)As region 63 of the core layer at the periphery thereof and a non-oxidized Al(Ga) As the 64 in the central part of the core layer, as shown in FIGS. 13A, 13B and 13C which are taken along lines A–A', B–B', and C–C', respectively, in FIG. 12C.

The oxidation rate of the core layer is 2 μm/min. for the composition of AlAs at each peripheral part and 0.2 μm/min. for the composition of $Al_{0.3}Ga_{0.7}As$ at the central part. In the oxidized region, AlAs is converted to $Al_xO_y$ (Al oxide) having a refractive index of 1.6 which is reduced from the previous 2.95 of the AlAs. Accordingly, incident light can be confined within the central, non-oxidized region 64, which functions as a waveguide having a higher refractive index.

Figure 13A:
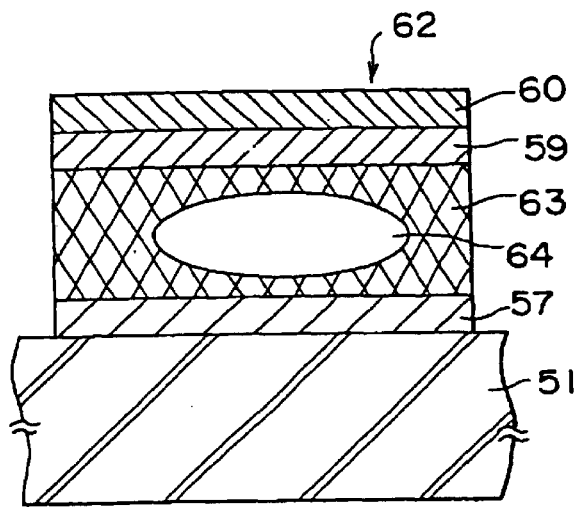
FIGS. 13A, 13B and 13C are cross-sectional views of the semiconductor optical device of FIGS. 11A and 11B at the step after oxidation of the core layer, taken along lines A–A', B–B' and C–C' in FIG. 12B.
Figure 13B:
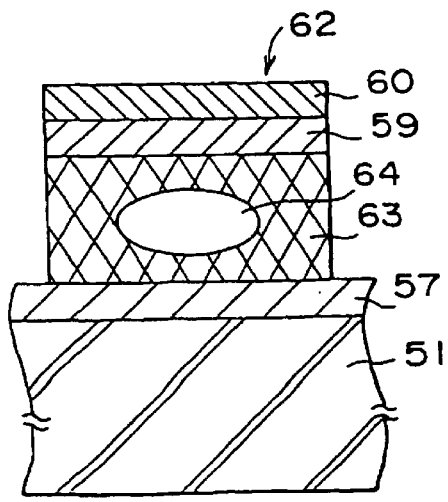
Figure 13C:
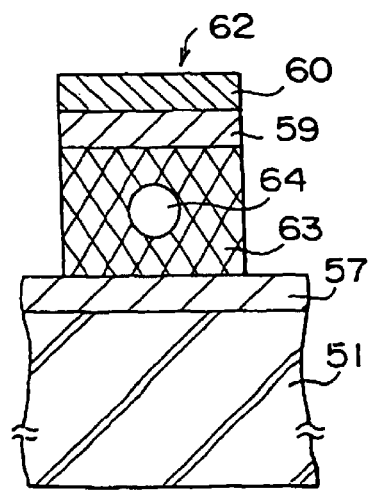

The cross-section of the waveguide is of an ellipse having a vertical axis of 1.0 μm and a horizontal axis of 4.0 μm at the light receiving end adjacent to the laser section as shown in FIG. 13A, is of a circle having a radius of 1.0 μm at the light emitting end as shown in FIG. 13C, and is of an ellipse having a mean size and shape of those of the light receiving end and the light emitting end as shown in FIG. 13B.

As described above, the mode field of the waveguide is gradually expanded along the travelling direction of light to form a small circle at the light emitting end, which raises a coupling efficiency in optical coupling with an optical fiber. In this manner, the tapered ridge 62 functions as a spot size conversion section or converter. The oxidized region 63 exhibits a dielectric property which suppresses a waste current injection into the spot size converter.

Then, both sides of each ridge are coated by polyimide, followed by polishing of the bottom surface of the substrate to reduce the thickness of the substrate down to 100 μm, and subsequent formation of p-side and n-side electrodes on respective surfaces of the resultant wafer. The final structure is not specifically shown in the figure; however, it will be understood from the structure shown in FIG. 10B.

In the semiconductor laser device having a spot size converter according to the present embodiment, the emitted light has a substantially circular beam profile because of the spot size converter being formed by the oxidized and non-oxidized Al(Ga)As regions of the tapered ridge 62. That is, the laser device of the present embodiment achieves a circular and narrowed beam profile as in the case of a conventional semiconductor laser device having a MFC. In addition, the laser device of the present embodiment has a function of suppressing a waste current injected in the spot size converter. Further, the undoped layers of the spot size converter is transparent to a laser beam, which improves transmission efficiency.

The fifth embodiment is described above with reference to a semiconductor laser device lasing at a 980 nm wavelength, but not limited thereto. The etching step for forming the ridge structure may be effected by dry-etching, such as RIE and RIBE, as well as a wet etching.

In addition, the fifth embodiment is described with reference to a laser device having a waveguide formed from an Al(Ga)As core layer, but not limited thereto. The core layer may be made of a material selected from materials which contain Al and are controlled in its refractive index by oxidation. Examples of the materials used for the core layer include $Al_xIn_{1-x}As$, $Al_xIn_{1-x}P$, $Al_xGa_{1-x}P$, $(Al_xGa_{1-x})_yIn_{1-y}As$, $(Al_xGa_{1-x})_yIn_{1-y}P$, $Al_xGa_{1-x}N$, $Al_xIn_{1-x}N$, $Al_xGa_yIn_{1-(x+y)}N$ (x=0–1, y=0–1) etc. and a combination of two or more of them.

Figure 14A:
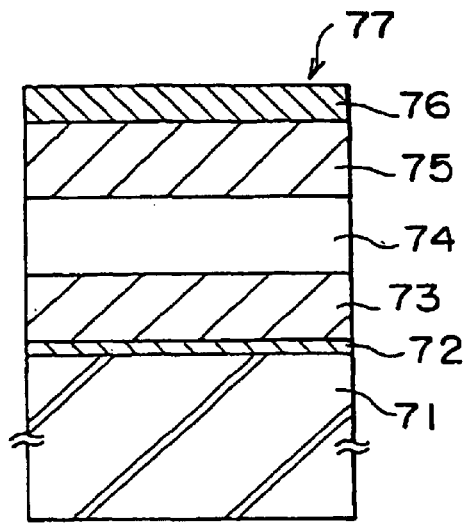
FIGS. 14A and 14B are cross-sectional views of a semiconductor optical device in consecutive steps of a fabrication process according to a sixth embodiment of the present invention.
Figure 14B:
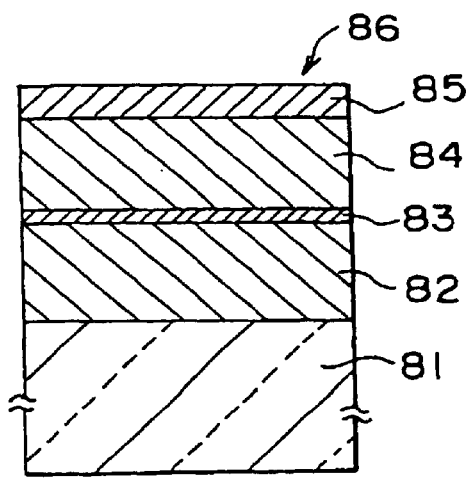
Figure 15A:
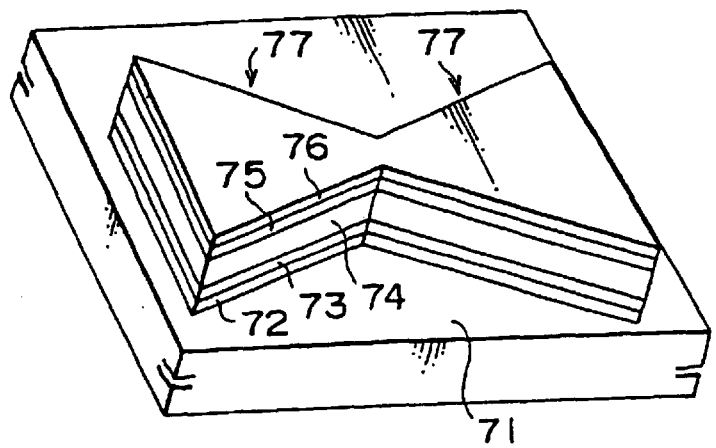
FIGS. 15A and 15B are perspective views of portions of the semiconductor optical device of FIGS. 14A and 14B in consecutive steps of the fabrication process.
Figure 15B:
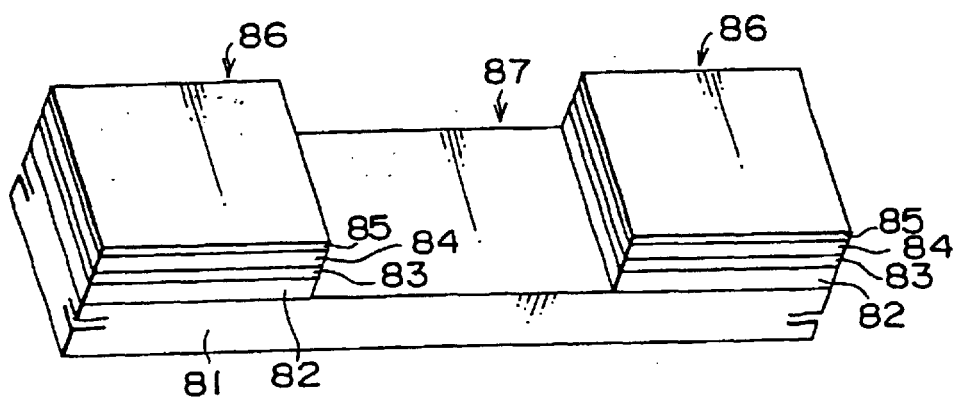

A semiconductor laser device having another spot size converter according to a sixth embodiment of the present invention will be described with reference to FIGS. 14A, 14B, 15B and 15B showing the fabrication steps thereof. An InGaP etch stop layer 72, an $Al_{0.3}Ga_{0.7}As$ cladding layer 73 and an Al(Ga)As core layer 74 having an Al content which increases from the central part thereof, as viewed in the direction of thickness, toward the peripheral parts thereof, an $Al_{0.3}Ga_{0.7}As$ cladding layer 75 and a GaAs contact layer 76 are consecutively grown on a GaAs substrate 71 by a MOCVD process, as shown in FIG. 14A.

Subsequently, the GaAs contact layer 76, $Al_{0.3}Ga_{0.7}As$ cladding layer 75, Al(Ga)As core layer 74, $Al_{0.3}Ga_{0.7}As$ layer 73 and InGaP etch stop layer 72 are selectively removed by a photolithography and an etching technique, thereby forming a mesa tapered ridge 77 for obtaining spot size converters, as shown in FIG. 15A. In the same drawing, a pair of tapered ridges 77 for the spot size converters are shown, with the distal ends of both the tapered ridges 77 are abutted against each other. The width of the tapered ridges 77 are controlled to a suitable value as in the case of the previous embodiment.

The entire wafer is submerged in hot pure water maintained at about 90° C. bubbled with nitrogen ($N_2$) gas for a thermal treatment at 400° C.~450° C. for a minute, thereby selectively oxidizing the Al(Ga)As core layer 74 in the tapered ridge 77 to form spot size converters which have a predetermined waveguide structure.

An n-InP substrate 81 is separately prepared, as shown in FIG. 15B, and an n-InP cladding layer 82, GRIN-SCH-MQW (graded-index/separate-confinement-heterostructure/multiple-quantum-well) active layer 83, a p-InP cladding layer 84, a p-InGaAs contact layer 85 are consecutively grown on the n-InP substrate 81 by a MOCVD technique. Subsequently, the p-InGaAs contact layer 85, p-InP cladding layer 84, GRIN-SCH-MQW active layer 83 and n-InP cladding layer 82 are selectively removed by a photolithography and an etching technique, thereby obtaining a pair of semiconductor lasers 86 each of a stripe ridge structure and separated from each other by a concave area 87 where the semiconductor layers are removed as shown in FIG. 15B.

Subsequently, the pair of tapered ridges 77 of FIG. 15A is placed in the concave area 87 of FIG. 15B. Specifically, the GaAs substrate 71 carrying the pair of tapered ridges 77 and the InP substrate 81 carrying the stripe ridges 86, which are separately prepared, are bonded together by a direct bonding technique such that the waveguide of the tapered ridges 77 is aligned with the optical axis of the semiconductor laser section 86, and such that the GaAs contact layer 76 is in direct contact with the InP substrate 81.

During the direct bonding step, the semiconductor laser section 86 is first aligned with the tapered ridge by using a marker, and then both the surfaces of the InP substrate 81 and the GaAs substrate 71 are treated by using a HF (hydrofluoric) solution. After sticking both the wafers together, a thermal treatment is effected thereto for uniting both the wafers to obtain a bonded wafer. The thermal treatment is performed in an hydrogen ambient so that re-oxidation does not occur in the selectively oxidized region.

Figure 15C:
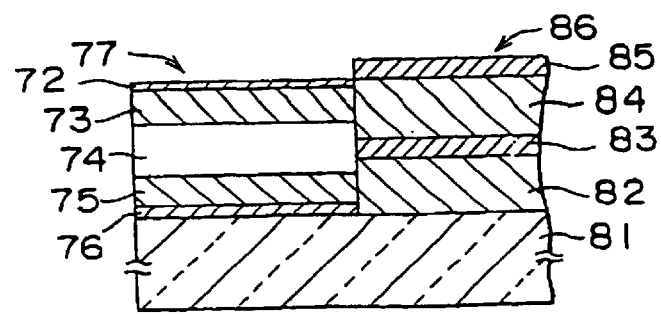
FIG. 15C is a cross-sectional view of the semiconductor optical device of FIGS. 14A and 14B after the fabrication process.

Thereafter, the GaAs substrate 71 is removed, the InP substrate 81 is polished at the bottom surface thereof to reduce the thickness thereof down to 100 μm, and severed at the center of the concave area 87, thereby obtaining a pair of semiconductor laser devices each having a spot size converter. One of the semiconductor laser devices thus obtained is shown in FIG. 15C in cross-section. Thereafter, p-side and n-side electrodes are formed on both sides of the bonded wafer to finish the semiconductor laser device according to the present embodiment having a spot size converter.

The present embodiment is effective to form a spot size converter of a tapered ridge when the core layer containing Al cannot be grown by an epitaxial growth technique, as in the case of different lattice constants between the substrate and the overlying layers. The process provides a spot size converter having an improved transmission to the wavelength of a laser beam.

A modified embodiment can be derived from the sixth embodiment wherein the GaAs substrate 71 having a spot size converter is bonded onto the InP substrate 81. In the modified embodiment, a first epitaxial layer structure for a laser element is formed on an InP substrate, and selectively removed therefrom. A second epitaxial layer structure formed on a GaAs substrate is then bonded to the first epitaxial layer structure by a direct bonding technique, followed by removal of the GaAs substrate. Then, a spot size converter of a tapered ridge structure is formed. The other steps are similar to those of the sixth embodiment.

Since the above embodiments are described only for examples, the present invention is not limited to the above embodiments and various modifications or alterations can be easily made therefrom by those skilled in the art without departing from the scope of the present invention.

What is claimed is:

1. A semiconductor optical waveguide comprising a first semiconductor layer overlying a semiconductor substrate, said first semiconductor layer having an aluminum concentration which increases from a central part, as viewed in the thickness direction of said semiconductor layer toward both surfaces of said first semiconductor layer, said first semiconductor layer having a non-oxidized region constituting an optical waveguide and an oxidized region surrounding said non-oxidized region and an optical element having an active layer coupled with said optical waveguide.

2. A semiconductor optical waveguide as defined in claim 1 wherein said first semiconductor layer has a composition of $Al_xGa_{1-x}As$, given x being not greater than 1.

3. A semiconductor optical device as defined in claim 1, wherein said optical element is a semiconductor laser.

* * * * *